(12) United States Patent
Raab et al.

(10) Patent No.: US 9,051,851 B2
(45) Date of Patent: Jun. 9, 2015

(54) METHOD AND APPARATUS FOR RECOVERING HEAT AND CONVERTING IT INTO MECHANICAL POWER IN A DRIVE SYSTEM FOR MOTOR VEHICLES

(75) Inventors: Gottfried Raab, Perg (AT); Josef Klammer, Garsten (AT)

(73) Assignee: MAN Truck & Bus AG, Munich (DE)

( * ) Notice: Subject to any disclaimer, the term of this patent is extended or adjusted under 35 U.S.C. 154(b) by 171 days.

(21) Appl. No.: 13/530,767

(22) Filed: Jun. 22, 2012

(65) Prior Publication Data
US 2012/0324891 A1    Dec. 27, 2012

(30) Foreign Application Priority Data
Jun. 22, 2011    (DE) .......................... 10 2011 105 709

(51) Int. Cl.
| | |
|---|---|
| F01K 1/00 | (2006.01) |
| F01K 3/00 | (2006.01) |
| F01K 23/10 | (2006.01) |
| F01K 1/08 | (2006.01) |
| F01K 3/10 | (2006.01) |
| F01K 23/06 | (2006.01) |
| F02G 5/02 | (2006.01) |
| F01K 1/16 | (2006.01) |
| F01K 23/02 | (2006.01) |
| F01K 23/14 | (2006.01) |

(52) U.S. Cl.
CPC .................. *F01K 1/08* (2013.01); *Y02T 10/166* (2013.01); *F01K 3/10* (2013.01); *F01K 23/065* (2013.01); *F02G 5/02* (2013.01); *F01K 1/16* (2013.01); *F01K 23/02* (2013.01); *F01K 23/14* (2013.01)

(58) Field of Classification Search
CPC ............... F01K 1/08; F01K 1/16–1/18; F01K 3/08–3/10; F01K 23/06; F01K 23/065; F01K 23/10–23/108; F01K 1/00–1/20; F01K 3/00–3/267; F02G 5/00–5/04; Y02T 10/16–10/166

USPC ........................... 60/613–624, 643–681, 597
See application file for complete search history.

(56) References Cited

U.S. PATENT DOCUMENTS

| | | | | |
|---|---|---|---|---|
| 1,897,815 A | * | 2/1933 | Osenberg ........................ | 60/659 |
| 3,955,358 A | * | 5/1976 | Martz et al. ................ | 60/39.182 |
| 4,120,157 A | * | 10/1978 | Tang ............................... | 60/618 |
| 5,327,987 A | * | 7/1994 | Abdelmalek .............. | 180/65.25 |

(Continued)

FOREIGN PATENT DOCUMENTS

| | | |
|---|---|---|
| DE | 503137 C | 7/1930 |
| DE | 102008027172 A1 | 12/2009 |
| JP | S5820911 A | 2/1983 |

*Primary Examiner* — Thomas Denion
*Assistant Examiner* — Laert Dounis
(74) *Attorney, Agent, or Firm* — Laurence A. Greenberg; Werner H. Stemer; Ralph E. Locher

(57) ABSTRACT

A method and an apparatus recover heat and convert the heat into mechanical power in a drive system for motor vehicles. A working medium carried in a working medium circuit is evaporated by an evaporator integrated into the working medium circuit by waste heat from an internal combustion engine. The vapor generated is fed to an expansion machine coupled to the internal combustion engine, and the exhaust vapor from the expansion machine is then converted back into the liquid phase in at least one condenser. Accordingly at least one valve, which can be subjected to control by a control device, and a vapor accumulator are integrated into the working medium circuit downstream of the evaporator such that the vapor generated is fed into the vapor accumulator. The vapor stored in the vapor accumulator is fed back at least in part into the working medium circuit to drive the expansion machine.

25 Claims, 5 Drawing Sheets

(56) References Cited

U.S. PATENT DOCUMENTS

| | | |
|---|---|---|
| 5,385,214 A | 1/1995 | Spurgeon |
| 2003/0024248 A1* | 2/2003 | Klatt et al. ............... 60/653 |
| 2009/0071156 A1* | 3/2009 | Nishikawa et al. ......... 60/660 |
| 2012/0291418 A1* | 11/2012 | Rusche ..................... 60/273 |

* cited by examiner

METHOD AND APPARATUS FOR RECOVERING HEAT AND CONVERTING IT INTO MECHANICAL POWER IN A DRIVE SYSTEM FOR MOTOR VEHICLES

CROSS-REFERENCE TO RELATED APPLICATION

This application claims the priority, under 35 U.S.C. §119, of German application DE 10 2011 105 709.2, filed Jun. 22, 2011; the prior application is herewith incorporated by reference in its entirety.

BACKGROUND OF THE INVENTION

Field of the Invention

The present invention relates to a method for recovering heat and converting it into mechanical power in a drive system for motor vehicles and to an apparatus for carrying out a method of this kind.

A method of this kind is widely known. The design configuration of the system components, especially of the evaporator, the expansion machine (continuous flow machine or reciprocating piston machine) and the condenser allows for conventional long-distance motorway driving, i.e. more or less steady-state operation of the internal combustion engine, and, in this mode, contributes to an increase in the efficiency of the drive system. The coolant or the boost air and especially the exhaust gas from the internal combustion engine can be used as feasible heat transfer media, for example. The less steady the operation of the internal combustion engine becomes, as in the case of alternating upward and downward slopes or in the case of vehicles involved in distribution for instance, the lower is the achievable efficiency of heat recovery.

SUMMARY OF THE INVENTION

It is an object of the invention to develop a method for recovering heat and converting it into mechanical power in a drive system for motor vehicles in such a way that satisfactory efficiency of the drive system can be achieved, even in non-steady-state operation. The intention is furthermore to indicate a particularly suitable apparatus for carrying out a method for recovering heat and converting it into mechanical power in a drive system for motor vehicles.

The invention proposes a method for recovering heat and converting it into mechanical power in a drive system for motor vehicles, in which a working medium carried in a working medium circuit is evaporated with the aid of at least one evaporator integrated into the working medium circuit by waste heat from an internal combustion engine of the motor vehicle. The vapor generated is fed to an expansion machine coupled to the internal combustion engine, and the exhaust vapor from the expansion machine then being converted back into the liquid phase in at least one condenser. According to the invention, at least one valve, which can be subjected to open-loop and/or closed-loop control by an open-loop and/or closed-loop control device, and a vapor accumulator are integrated into the working medium circuit downstream of the at least one evaporator in such a way that, especially when the motive power of the expansion machine is not required and/or especially when the internal combustion engine is not being operated under power (especially in overrun and/or engine braking mode), the vapor generated is fed at least in part into the vapor accumulator, preferably with the expansion machine shut off at the same time. The vapor stored in the vapor accumulator is or can then be fed back at least in part into the working medium circuit, preferably immediately following the vapor storage phase, in order to drive the expansion machine if the motive power of the expansion machine is required and/or the internal combustion engine is being operated under power. The method according to the invention achieves two significant improvements in nonsteady driving mode: the expansion machine, the mechanical power of which is not required especially in overrun and/or engine braking mode, can be at least partially and preferably completely shut off from the vapor supply while, at the same time, the vapor or superheated vapor that is still being generated in the system (due to residual heat, inertia in the system, exhaust gas heat in engine braking mode) is delivered to and/or stored in the vapor accumulator. When the motive power of the expansion machine is required again and/or when the internal combustion engine is being operated under power again, the expansion machine can then be supplied directly with the vapor or superheated vapor from the vapor accumulator and thus once again delivers additional power with almost no delay. In nonsteady-state operation of the internal combustion engine, it is thus possible for expander power to be fed in even in the high-consumption acceleration phases, thereby improving the response thereof and counteracting the drop in the efficiency of the drive system in nonsteady-state operation.

In order to effect a particularly smooth transition from the accumulator mode of the expansion machine, in which the vapor accumulator is drawn upon, back to normal vapor supply by the evaporator, a particularly preferred specific process control technique involves the proposal that, during a heating phase of the working medium circuit, which preferably immediately follows the vapor storage phase, in particular the overrun and/or engine braking mode, the vapor accumulator is connected to the expansion machine, on the one hand, and the at least one evaporator (or at least one of several evaporators) is connected to a bypass line which short-circuits the expansion machine, on the other hand, thus enabling the expansion machine to be supplied with vapor from the vapor accumulator until the working medium in the working medium circuit has once again been heated by the at least one evaporator to a defined and/or predetermined superheated vapor temperature. A process control technique of this kind is furthermore simple to achieve in terms of open-loop and/or closed-loop control and can be operated in a functionally reliable manner.

In conjunction with a heating phase of this kind, it is furthermore proposed that the supply of vapor from the vapor accumulator is stopped when the defined and/or predetermined superheated vapor temperature is reached and that, furthermore, the bypass line is shut off again and that, finally, the expansion machine is once again supplied only with vapor from the at least one evaporator in conventional expansion machine operation.

As an alternative or in addition, provision can be made for the bypass line to be shut off again when the defined and/or predetermined superheated vapor temperature is reached, and the expansion machine is thus once again supplied with vapor from the at least one evaporator, as in conventional expansion machine operation, the supply of vapor from the vapor accumulator being stopped only when the vapor accumulator has been emptied completely or down to a defined residual quantity. In hybrid-mode operation of this kind, it is ensured that the vapor accumulator is emptied in the desired manner, the available residual vapor in this hybrid mode being introduced and fed in at an appropriate point ahead of or in the expansion machine.

In an expedient development, the useful volume of the vapor accumulator is preferably configured in such a way that a mass of vapor corresponding to average engine braking operating phases can be stored. Such an average value can be determined empirically, if required, and ensures that, after the motor vehicle has traveled down a slope, for example, the expansion machine can be supplied with stored vapor or superheated vapor until the evaporation system containing the at least one evaporator is sufficiently operational again. On the other hand, installation criteria and charging times of the vapor accumulator must also be taken into account.

According to a particularly preferred process control technique, it is furthermore envisaged that a bypass line that short-circuits the expansion machine is released and/or opened when a maximum operating pressure of the vapor accumulator is reached during the vapor storage phase. This increases operational reliability and helps to avoid excess pressures in the vapor accumulator. Given adequate vapor generation, the bypass line makes it possible to maintain the operational readiness of the system without cooling of lines and functional components and without an excess system pressure, thus likewise contributing to an improved response during the transition to the driving mode.

As a particularly preferred option, the exhaust system of the internal combustion engine is used as a heat source for the at least one evaporator during the vapor storage phase or during the overrun and/or engine braking phases, especially if the internal combustion engine has at least one throttling device in the exhaust section for generating the engine braking power. Throttling devices of this kind (e.g. exhaust flaps, variable timing of the engine valves etc.) make it possible to maintain high exhaust gas temperatures, even in the engine braking operating phases. As an alternative or in addition to an exhaust system, however, it is also possible in principle to use other heat sources within the vehicle, e.g. an engine coolant and/or boost air, to name just two additional examples.

In an advantageous additional function, the vapor or superheated vapor collected in the vapor accumulator can additionally be used to blow condensing working medium out of functional components of the working medium circuit after the internal combustion engine has been stopped and/or at winter temperatures. This makes it possible, for example, to counteract freezing of control valves or of the evaporator when outside temperatures are freezing, without the risk of introducing air into the working medium circuit of the heat recovery system. This additional function is advantageous especially in the case of working medium circuits which are closed off from the environment.

The vapor accumulator can be encased with suitable insulating measures to provide thermal insulation. However, a preferred proposal is that the vapor accumulator, which is embodied with a double shell for example, should be heated by the exhaust gas from the internal combustion engine and thus remain effective as a storage medium, without heat losses, even for prolonged periods of time in driving mode.

A particularly advantageous apparatus for carrying out a method for recovering heat and converting it into mechanical power in a drive system for motor vehicles contains an internal combustion engine as a source of propulsion, an expansion machine, which is coupled in terms of drive to the internal combustion engine and is connected to at least one evaporator, which can be heated by waste heat from the internal combustion engine and is inserted into a working medium circuit containing at least one condenser. According to the invention, there is arranged in a forward-flow line of the working medium circuit, downstream of the at least one evaporator, at least one valve, which can be subjected to open-loop and/or closed-loop control by an open-loop and/or closed-loop control device and by which the forward-flow line can be connected to a vapor accumulator and/or the expansion machine can be shut off when the motive power of the expansion machine is not required and/or when the internal combustion engine is not being operated under power, preferably at least in the overrun and/or engine braking mode of the motor vehicle.

A multi-way valve, by which the expansion machine and/or the vapor accumulator can be connected to the at least one evaporator in a manner which is simple in terms of construction and control, can preferably be provided in the forward-flow line.

Moreover, a bypass line which short-circuits the expansion machine, preferably a bypass line containing a throttle valve, can additionally be connected to the valve which feeds the vapor into the vapor accumulator, which is preferably a multi-way valve, it being possible for the vapor accumulator and/or the expansion machine and/or the bypass line to be connected to the at least one evaporator with little outlay on piping by the valve which feeds the vapor into the vapor accumulator.

The bypass line can furthermore open into the exhaust vapor line leading to the condenser downstream of a nonreturn valve arranged after the expansion machine. The nonreturn valve is a reliable way of avoiding backflow into the expansion machine when vapor is flowing via the bypass line, something which would impair the operation of the expansion machine.

The vapor accumulator can be connected via a separate pressure line containing a controllable valve to the forward-flow line downstream of the valve or multi-way valve, which feeds the vapor into the vapor accumulator, and can be connected to the line upstream of the expansion machine. As an alternative, however, it is also possible for the vapor accumulator to be connected to the expansion machine, in parallel with the forward-flow line, by a pressure line containing a controllable valve. This makes it possible to introduce vapor selectively into the expansion machine during the expansion of the vapor, preferably in a reduced-pressure region of the expansion space, thereby boosting the power. This has the particular advantage that the larger pressure drop increases the usage capacity of the vapor accumulator or enables it to be emptied to a lower pressure in accumulator mode.

To enable the energy of the exhaust gas to be used, the at least one evaporator can be mounted in an appropriate manner on the exhaust line system of the internal combustion engine. However, it would also be possible, if required, for the coolant of the internal combustion engine or the boost air in the case of a pressure-charged internal combustion engine to be used as a heat transfer medium. The same applies to the vapor accumulator or casing thereof, which is preferably heated by the exhaust gases of the internal combustion engine.

In a preferred additional function of the heat recovery system, the vapor accumulator can be connected to the inlet side of the evaporator by a controllable valve and of a blow-off line, with the superheated vapor stored in the vapor accumulator being used to blow out any liquid working medium that has been deposited in the evaporator and in the downstream line system, in order as far as possible to prevent damage to the evaporator due to freezing in winter operation for example, without the risk of introducing air into the working medium circuit of the heat recovery system. This additional function is advantageous especially in the case of working medium circuits which are closed off from the environment.

Another functional improvement of the heat recovery system can be achieved if the vapor accumulator has a plurality of chambers, which are connected to one another in such a way, by pressure relief valves (filling valves and emptying valves), that the filling thereof can take place in succession or separately from one another and the emptying thereof can take place together. In this way, a variable vapor accumulator charging time is achieved, with a relatively rapid pressure build-up in the individual chambers. Once a first chamber of the vapor accumulator reaches the predetermined accumulator pressure, a pressure relief valve (filling valve) opens to the second chamber etc. Conversely, all the chambers are emptied together through the opening of the other pressure relief valves (emptying valves) in the accumulator mode of the expansion machine. Partially filled chambers are emptied only when all further filled chambers have fallen to the pressure prevailing in the partially filled chamber. The opening and closing of the pressure relief valves is controlled by the pressure conditions in the chambers.

In an advantageous embodiment of the invention, it may furthermore be advantageous if a plurality of evaporators, e.g. two evaporators, is/are connected to the exhaust line system of the internal combustion engine, which evaporators are connected to a respective feed line in the working medium circuit, which feed line can be controlled by a valve, and to a combined forward-flow line and can be supplied individually, in groups or jointly with working medium under open-loop or closed-loop control by the valves. In particular, it may be expedient if just one evaporator is activated when there is a high power demand for the internal combustion engine and if a plurality of evaporators, e.g. both evaporators, are activated when there is a low power demand, in order to match the respective capacity of the expansion machine, on the one hand, and the heat dissipation capacity of the vehicle cooling system, on the other hand. It may furthermore be possible for just one evaporator to be activated in accumulator mode with the expansion machine switched off, owing to the available heat from the individual heat sources, and for all or both evaporators to be activated in normal driving mode.

The vapor accumulator can furthermore be connected to the working medium circuit downstream of the condenser by at least one geodetically low-lying condensate line in order to reliably remove any accumulating condensate in the vapor accumulator.

Finally, it is particularly expedient if a feed pump, which supplies the evaporators from a reservoir, a suction pump, which is positioned upstream of the condenser and delivers into the reservoir, with an interposed filter unit, and a return line leading to the reservoir and having a pressure limiting valve for the feed pump are provided on the liquid side in the working medium circuit of the heat recovery system. The working medium in the reservoir can be deionised water or a mixture containing the latter.

Other features which are considered as characteristic for the invention are set forth in the appended claims.

Although the invention is illustrated and described herein as embodied in a method and an apparatus for recovering heat and converting it into mechanical power in a drive system for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
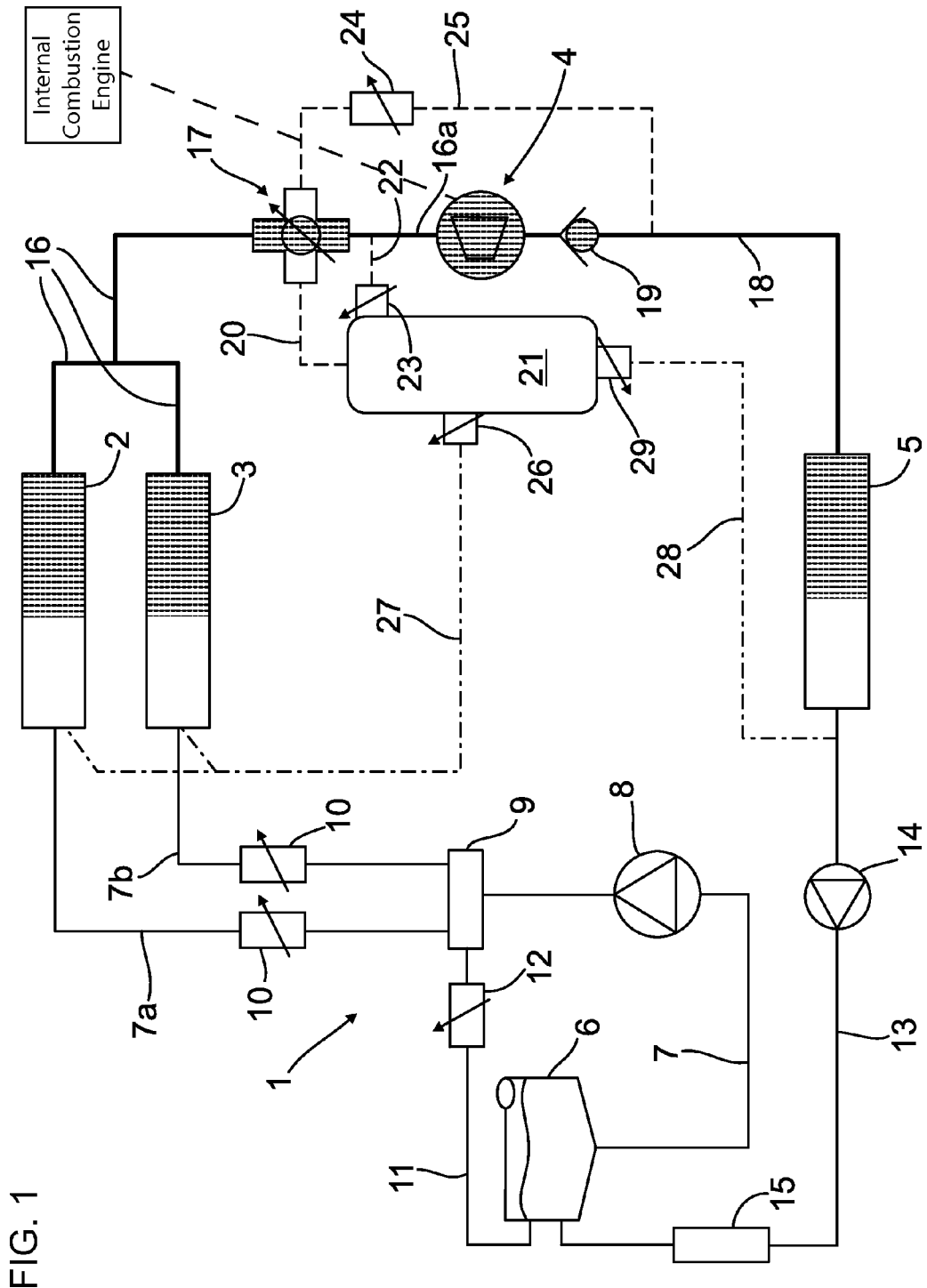
FIG. 1 is a block diagram of a pump-operated heat recovery apparatus having an expansion machine for an internal combustion engine in a drive system of motor vehicles, having inter alia two evaporators, a condenser, a vapor accumulator and a plurality of controllable valves in a normal driving mode with an expansion machine supplied with vapor according to the invention.

Referring now to the figures of the drawing in detail and first, particularly, to FIG. 1 thereof, there is shown a block diagram of an apparatus for recovering heat and converting it into mechanical power for a drive system in motor vehicles, especially in commercial vehicles, e.g. lorries or buses, having a non-illustrated internal combustion engine as a source of propulsion. The apparatus has a working medium circuit 1, into which inter alia evaporators, in this case two evaporators 2, 3 by way of example, an expansion machine 4 and a condenser 5 are integrated.

Deionized water, which is introduced into a reservoir 6, from the underside of which a feed line 7 branches off, is used as the working medium, for example. A feed pump 8, which supplies separate feed lines, in this case two feed lines 7a, 7b, which are connected to an inlet side of the evaporators 2, 3, via a manifold is provided in the feed line 7. Installed in each of the feed lines 7a, 7b in this case, also by way of example, is an electric proportional flow control valve 10, by which the mass flow of working medium and hence the production of vapor can be controlled.

A return line 11 containing an integrated pressure limiting valve 12 is connected to a manifold 9, the return line 11 opening into the reservoir 6.

A further return line 13, which likewise opens into the reservoir 6 and in which a condensate suction pump 14 and a filter unit 15 are arranged in the direction of flow, is furthermore connected to an outlet of the condenser 5.

The evaporators 2, 3, of which there are just two in this case by way of example, are, for example, mounted on the exhaust system of the internal combustion engine in a manner not illustrated or are coupled to the exhaust system in a manner which allows heat transfer, and are subjected to heat exchange with the hot exhaust gas from the internal combustion engine in order to convert the liquid working medium to the vapor phase.

In this case, by way of example, the working medium converted to vapor, preferably superheated vapor, in the evaporators 2, 3 is passed to the expansion machine 4 initially via two and then via a combined forward-flow line 16 at a defined or predetermined excess pressure, the forward-flow line 16 having arranged therein a multi-way valve 17, by which the superheated vapor can be distributed as described below.

The expansion machine 4 can be a continuous flow machine or a reciprocating piston machine of defined configuration and power, for example, which, when supplied with vapor or superheated vapor, preferably at excess pressure, supplies output power directly or indirectly to the internal combustion engine as an additional drive. However, the expansion machine 4 may also drive some other device in the motor vehicle, e.g. an air conditioning system, a compressor, a fan, an alternator etc.

An exhaust vapor line 18, into which a non-return valve 19 is furthermore inserted and which opens into the inlet side of the condenser 5 which converts the working medium back into the liquid phase by condensation, is connected to the outlet side of the expansion machine 4.

A first pressure line 20, which leads to a vapor accumulator 21 arranged in the motor vehicle, is connected to the multi-way valve 17. The vapor accumulator 21 is thermally insulated in a manner not illustrated and, in terms of its volume or storage capacity, is configured in such a way that it can supply the expansion machine 4 with superheated vapor under excess pressure or system pressure for a defined period of time when in the filled state.

For this purpose, a second pressure line 22, which opens into the forward-flow line 16 or section 16a thereof downstream of the multi-way valve 17 but upstream of the expansion machine 4 and in which is arranged a controllable valve 23, by which the pressure line 22 can be shut off or opened towards the expansion machine 4, is connected to the vapor accumulator 21.

Branching off from the multi-way valve 17 there is furthermore a bypass line 25 containing an integrated throttle valve 24, which is connected to the exhaust vapor line 18 downstream of the non-return valve 19.

Leading away from the vapor accumulator 21 there is furthermore a blow-off line 27 (illustrated in chain-dotted lines), which can be controlled by a valve 26, is connected to the evaporators 2, 3 on the inflow side thereof and purges the evaporators 2, 3 and the following valves and lines in an appropriate manner with superheated vapor by brief opening of the valve 26, removing any condensate which may have collected, each time the internal combustion engine is stopped for example.

Any condensate which may have collected in the vapor accumulator 21 can be discharged periodically into the return line 13 upstream of the suction pump 14 via a condensate line 28 (likewise illustrated in chain-dotted lines) containing a geodetically low-lying discharge valve 29 on the vapor accumulator 21.

The valves 17, 23, 26 and 29 mentioned and the flow control valves 10, of which there are two in this case by way of example, in the feed lines 7a, 7b are controlled electrically by a non-illustrated electronic control unit as described below; the control unit may be the electronic control unit of the internal combustion engine, in which the operating parameters required for control, such as the state of load of the internal combustion engine, the vehicle speed, engine overrun and engine braking mode, engine temperature, exhaust gas temperature etc. have already been acquired in any case and thus enable implementation to be achieved with relatively little additional outlay. In addition, a non-illustrated pressure sensor is provided at least in the vapor accumulator 21 and/or in the forward-flow line 16 in order to avoid an impermissible excess pressure or to detect the system pressure.

FIG. 1 shows the apparatus 1 for recovering heat in normal driving mode (more or less steady-state), in which both evaporators 2, 3 are supplied with working medium via the flow control valves 10 and generate superheated vapor, which is passed to the expansion machine 4 via the forward-flow line 16 and the multi-way valve 17 and, after being correspondingly expanded by the latter through the release of mechanical motive power, flows to the condenser 5 via the exhaust vapor line 18. After the condenser 5, the condensed working medium, which is once again liquid, flows back into the reservoir 6 via the filter unit 15.

The circulation described is maintained by the two pumps 8, 14. Depending on the operating point of the internal combustion engine and hence on the prevailing mass flows and temperatures in the individual heat sources, the quantity of vapor that can be generated, which is controlled by the flow control valves 10, and the rotational-speed-dependent capacity of the expansion machine result in a system pressure downstream of the evaporators 2, 3. Lines 20 and 25 branching off from the multi-way valve 17 are shut off (illustrated in dashed lines). The pressure line 22 leading from the vapor accumulator 21 to the forward-flow line 16a is furthermore closed by the valve 23.

Figure 2:
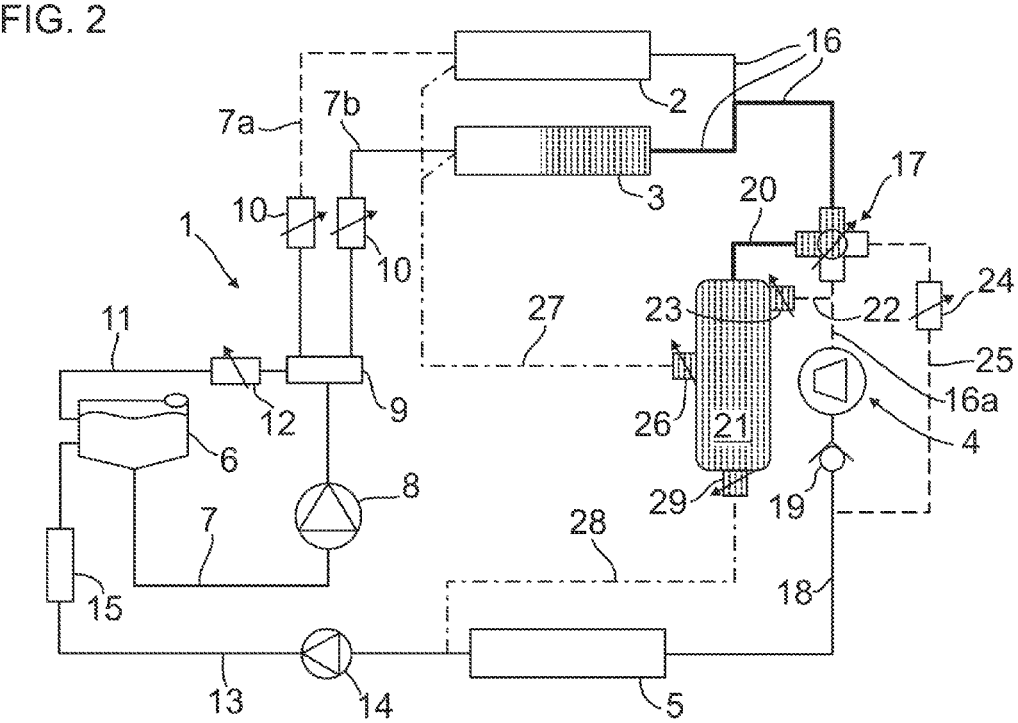
FIG. 2 is a block diagram showing the apparatus according to FIG. 1 but in an overrun and/or engine braking mode and with valves switched to charge the vapor accumulator.

FIG. 2 shows the apparatus 1, with the difference that the motor vehicle is in an engine braking mode, wherein throttling devices (engine valves, exhaust flaps etc.) arranged in the internal combustion engine and/or in the non-illustrated exhaust system are activated in order to generate the engine braking effect, thereby causing high exhaust gas temperatures.

In this operating state, the multi-way valve 17 is initially switched in such a way by the engine control unit that section 16a of the forward-flow line 16 is then interrupted (illustrated in dashed lines) and the pressure line 20 to the vapor accumulator 21 is opened. Accordingly, the vapor accumulator 21 is charged with superheated vapor for the time period of the engine braking mode or until a maximum system pressure is reached.

Figure 3:
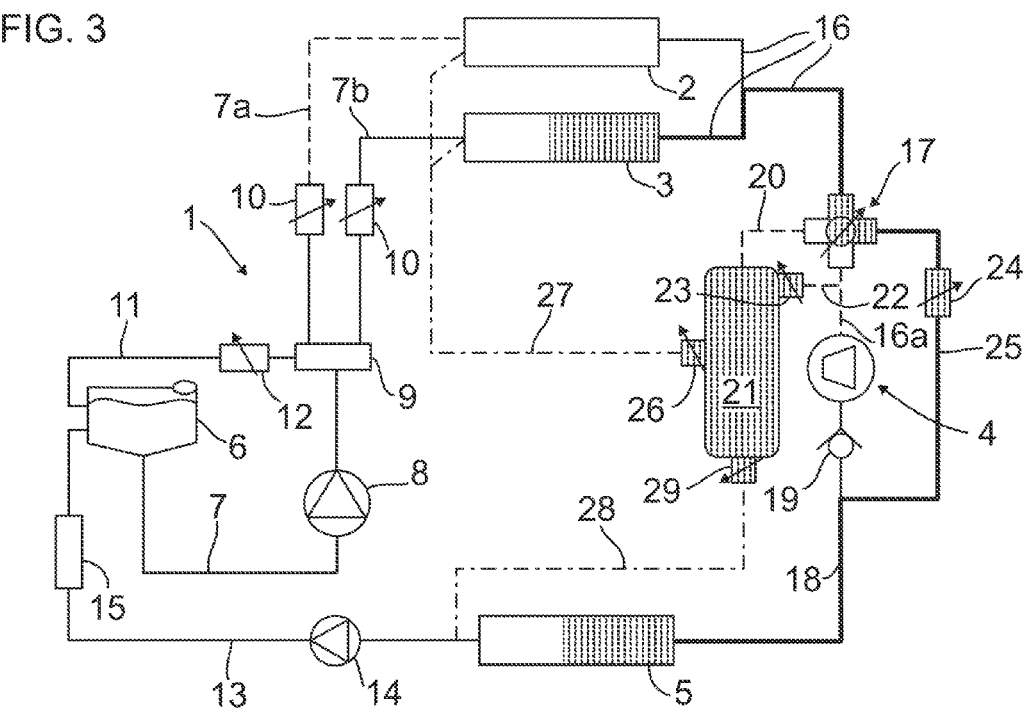
FIG. 3 is a block diagram showing the apparatus according to FIG. 2 with the vapor accumulator charged and a bypass line for the expansion machine activated.

If the maximum system or vessel pressure is reached during the engine braking mode, the multi-way valve 17 switches to throttling mode (as illustrated in FIG. 3), opening the bypass line 25 containing the integrated throttle valve 24 and thus discharging the excess superheated vapor into the exhaust vapor line 18. The throttling mode, when present, ensures that operation of the system upstream of the multi-way valve 17 is maintained. The superheated vapor under excess pressure in the vapor accumulator 21 is hermetically sealed off by the closed valves 17, 23, 26 and 29.

Figure 4:
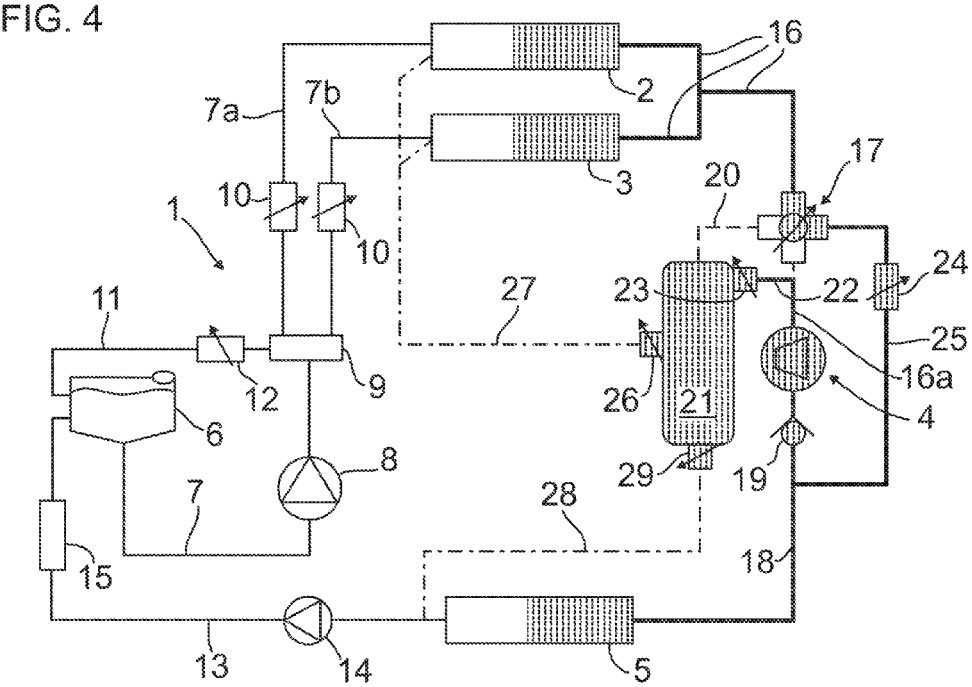
FIG. 4 is a block diagram showing the apparatus according to FIG. 3 immediately after a transition from the overrun and/or engine braking mode to a driving mode of the internal combustion engine, with the vapor accumulator open towards the expansion machine and the bypass line still open in order to heat the working medium circuit.

If the internal combustion engine switches back to the powered driving mode after the engine braking mode, the valve 23 on the vapor accumulator 21 is opened, while throttling mode is continued, as shown in FIG. 4, and the expansion machine 4 is supplied with almost no delay with the stored superheated vapor via the pressure line 22 and the forward-flow line 16a and is thus immediately available to output the maximum additional motive power. At the same time, the system upstream of the multi-way valve 17 can be run up in throttling mode until the bypass line is shut off again when the defined and/or predetermined superheated vapor temperature is reached, and the expansion machine is thus once again supplied with vapor from the at least one evaporator, as in conventional expansion machine operation.

Figure 5:
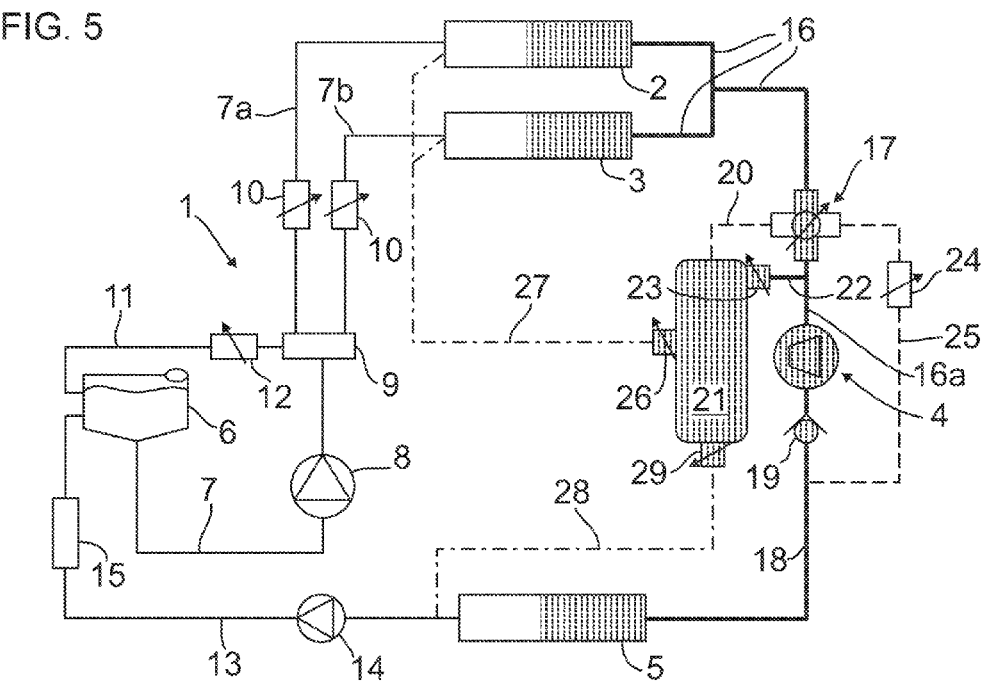
FIG. 5 is a block diagram showing the apparatus according to FIG. 4 in a controlled hybrid mode, in which the evaporators and the vapor accumulator are connected to the expansion machine.

Finally, FIG. 5 shows the transition from accumulator operation of the expansion machine to more or less steady-state operation, in which the multi-way valve 17 is once again set in such a way that it connects the evaporators 2, 3 or the forward-flow line 16, 16a to the expansion machine 4 (as shown in FIG. 1) but the valve 23 on the vapor accumulator 21 is still open.

This hybrid mode is expedient, for example, when there is still usable vapor pressure in the vapor accumulator 21, which is then superimposed on the system pressure in the forward-flow line 16, 16a. In this case, control can be performed by comparing the pressure values from pressure sensors in the vapor accumulator 21 and in the forward-flow line 16 using the electronic control unit.

Once the vapor accumulator 21 is empty or the vapor pressure thereof is too low, the valve 23 in the pressure line 22 is closed again, and the expansion machine 4 is supplied with vapor in the normal way directly via the evaporators 2 and/or 3, as shown in FIG. 1.

Figure 6:
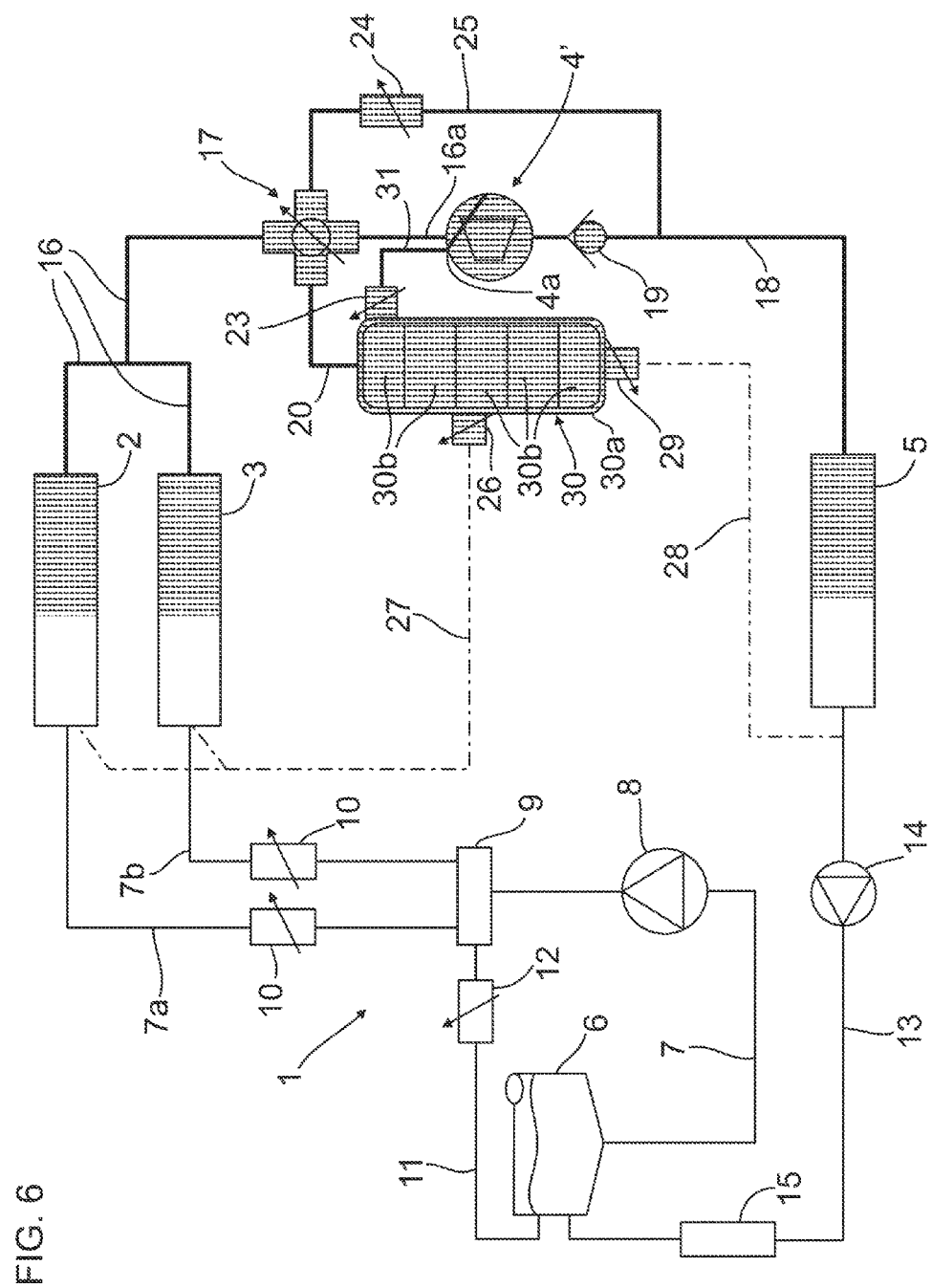
FIG. 6 is a block diagram showing an alternative embodiment of the apparatus according to FIGS. 1 to 5 in which the vapor accumulator is embodied with a plurality of chambers and can be connected directly to the expansion machine via a separate pressure line.

FIG. 6 shows an alternative embodiment of the heat recovery apparatus 1', but this is described only to the extent that it differs from the apparatus in FIGS. 1 to 5. Identical parts are provided with identical reference signs.

In FIG. 6, use is made of a vapor accumulator 30, the casing 30a of which is of double-walled design. The vapor accumulator in FIG. 6 is shown in detail in different embodiments in FIGS. 7 and 8 without the peripheral functional components or interfaces with the working medium circuit 17, 4, 4', 29, 28, 26, 27. To avoid heat losses, a shell 35 situated between the housing walls can be evacuated, filled with air or a suitable insulating material, or connected to or heated by the exhaust system of the internal combustion engine, for example, in a manner not shown.

The vapor accumulator 30 is furthermore divided into a plurality of chambers 30b by partition walls 36. These chambers are connected to one another by pressure relief valves (filling valves 32 and emptying valves 33) in such a way that they can be filled in succession or separately from one another and emptied together. Thus, in accumulator mode, the chamber 30b situated closest to the pressure line 20 is filled first and, after the predetermined vapor pressure is reached, the chamber 30b adjacent to this chamber 30b is filled etc. An adequate vapor pressure is thus available quickly, despite the relatively large overall volume of the vapor accumulator 30, and this pressure then propagates from chamber 30b to chamber 30b and ensures an effective supply of high pressure to the expansion machine 4 at all times, even after a short filling time.

Figure 7:
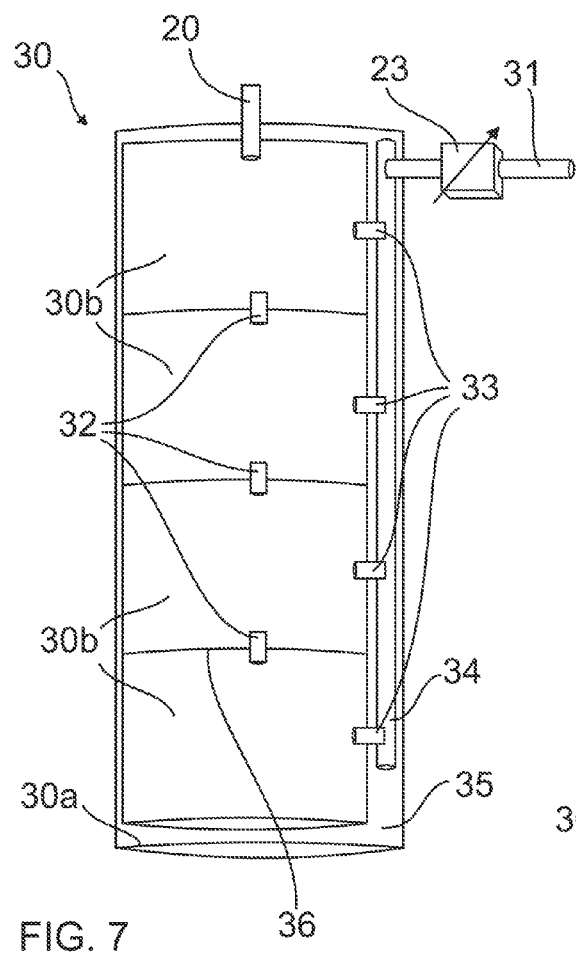
FIG. 7 is a first illustrative embodiment of a multi-chamber vapor accumulator.
Figure 8:
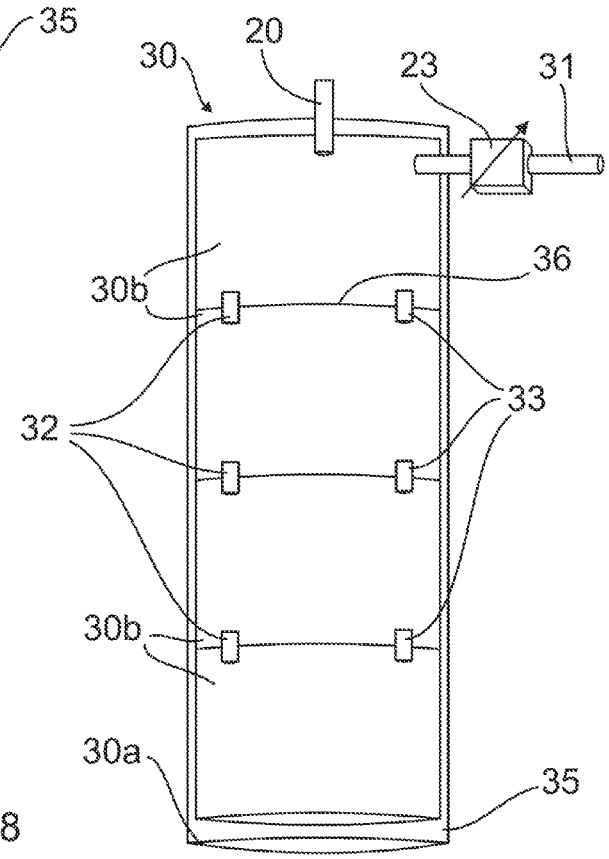
FIG. 8 is a second illustrative embodiment of the multi-chamber vapor accumulator.

The emptying of the vapor accumulator 30 upon the changeover from the overrun and/or engine braking mode to the driving mode of the internal combustion engine takes place in all chambers together through the opening of the valve 23 and, as a consequence, through the opening of the other pressure relief valves (emptying valves 33), with the outgoing pressure line 31 controlled by valve 23 being connected in the embodiment shown in FIG. 7 to a manifold rail 34. In the alternative embodiment in FIG. 8, the emptying of the chambers is performed in succession by the emptying valves 33. Partially filled chambers are emptied only when all the other filled chambers have fallen to the pressure prevailing in the partially filled chamber. The opening and closure of the pressure relief valves is controlled by the pressure conditions in the chambers.

Here, the pressure line 31 is furthermore embodied as a separate line running parallel to the forward-flow line 16a and is connected to a reduced-pressure inlet 4a of the expansion machine 4'. For this purpose, a non-illustrated further inlet valve can be provided on the expansion machine 4', for example, by which the superheated vapor stored in the vapor accumulator 30 is passed directly into the expansion space. Since the pressures here are periodically significantly lower during the expansion phase than at the vapor inlet of the expansion machine 4', the vapor accumulator 30 can be emptied at lower pressures, and hence the capacity thereof can be increased and the stored superheated vapor can be used more efficiently.

Moreover, the smaller residual quantities of vapor stored give rise to less condensate accumulation in the vapor accumulator 30.

In other respects, the operation of the heat recovery apparatus 1" (FIG. 6) is identical to that of the apparatus 1 described in FIGS. 1 to 5, and is therefore not described further.

In addition to the engine braking mode (retarder), the vapor accumulator 21 or 30 can also be charged in each case already during the overrun mode and, in special cases of operation, also in the powered mode of the motor vehicle through appropriate switching of the multi-way valve 17, while the supply to the expansion machine 4, 4' is simultaneously interrupted.

The invention claimed is:

1. A method for recovering heat and converting the heat into mechanical power in a drive system for motor vehicles, which comprises the steps of:
    evaporating a working medium carried in a working medium circuit with an aid of at least one evaporator integrated into the working medium circuit by means of waste heat from an internal combustion engine of the motor vehicle, the working medium circuit having at least one valve being subjected to one of open-loop or closed-loop control by an open-loop or closed-loop controller, and a vapor accumulator disposed downstream of the at least one evaporator such that when motive of an expansion machine is not required or the internal combustion engine is not being operated under power, vapor generated is fed at least in part into the vapor accumulator;
    feeding the vapor stored in the vapor accumulator back at least in part into the working medium circuit for driving of the expansion machine if at least one of a motive power of the expansion machine is required or the internal combustion engine is being operated under power;
    feeding the vapor generated to the expansion machine coupled to the internal combustion engine;
    converting exhaust vapor from the expansion machine back into a liquid phase in at least one condenser; and
    performing at least one of:
    using an exhaust system of the internal combustion engine as a heat source for the at least one evaporator during at least one of an overrun phase or an engine braking phase when the internal combustion engine has at least one throttling device in an exhaust section for generating engine braking power; or heating the vapor accumulator by exhaust gases from the internal combustion engine.

2. The method according to claim 1, which further comprises storing the vapor in the vapor accumulator at least during one of an overrun operating phase or an engine braking operating phase of the motor vehicle, which defines a vapor storage phase, and the vapor accumulator is accordingly connected in terms of flow to at least one of the evaporators.

3. The method according to claim 2, which further comprises:
connecting the vapor accumulator to the expansion machine during a heating phase immediately following the vapor storage phase; and
connecting the at least one evaporator to a bypass line which short-circuits the expansion machine, the expansion machine thus being supplied exclusively with the vapor from the vapor accumulator until the working medium in the working medium circuit has been heated by means of the at least one evaporator to a defined superheated vapor temperature.

4. The method according to claim 3, which further comprises:
stopping a supply of the vapor from the vapor accumulator when the defined superheated vapor temperature is reached;
shutting off the bypass line again; and
supplying the expansion machine only with the vapor from the at least one evaporator in a conventional expansion machine operation.

5. The method according to claim 3, which further comprises:
shutting off the bypass line again when the defined superheated vapor temperature is reached, and the expansion machine is thus once again supplied with the vapor from the at least one evaporator, as in conventional expansion machine operation; and
stopping a supply of the vapor from the vapor accumulator only when the vapor accumulator has been emptied completely or is down to a defined residual quantity.

6. The method according to claim 2, which further comprises performing at least one of opening and releasing a bypass line that short-circuits the expansion machine when a maximum operating pressure of the vapor accumulator is reached during the vapor storage phase.

7. The method according to claim 1, which further comprises using the vapor collected in the vapor accumulator to blow a condensing working medium out of functional components of the working medium circuit, including when the internal combustion engine is at least one of stopped or at winter temperatures.

8. The method according to claim 1, which further comprises feeding the vapor generated at least in part into the vapor accumulator when the expansion machine is shut off.

9. The method according to claim 2, which further comprises feeding the vapor stored in the vapor accumulator back at least in part into the working medium circuit immediately following the vapor storage phase.

10. An apparatus for carrying out a method for recovering heat and converting the heat into mechanical power in a drive system of a motor vehicle having an internal combustion engine functioning as a source of propulsion and having an exhaust line system, the apparatus comprising:
an open-loop or closed-loop controller;
a working medium circuit containing at least one condenser and a forward-flow line;
at least one evaporator being heated by waste heat from the internal combustion engine and inserted into said working medium circuit, said at least one evaporator coupled to the exhaust line system of the internal combustion engine;
an expansion machine coupled in terms of drive to the internal combustion engine and connected to said at least one evaporator;
a vapor accumulator having a casing and one of said vapor accumulator or said casing is heated by means of the exhaust line system of the internal combustion engine; and
at least one valve disposed in said forward-flow line of said working medium circuit, downstream of said at least one evaporator, said at least one valve being subjected to one of open-loop or closed-loop control by means of the open-loop or closed-loop controller and by means of which said forward-flow line is connected to said vapor accumulator or said expansion machine is shut off when a motive power of said expansion machine is not required and/or when the internal combustion engine is not being operated under power.

11. The apparatus according to claim 10, wherein said at least one valve is a multi-way valve disposed in said forward-flow line, by means of said multi-way valve at least one of said expansion machine or said vapor accumulator is connected to said at least one evaporator.

12. The apparatus according to claim 10, further comprising a bypass line which short-circuits said expansion machine and connected to said at least one valve which feeds the vapor into said vapor accumulator, it being possible for at least one of said vapor accumulator, said expansion machine or said bypass line to be connected to said forward-flow line and hence to said at least one evaporator by means of said at least one valve which feeds the vapor into said vapor accumulator.

13. The apparatus according to claim 10, further comprising:
an exhaust vapor line being routed away from said expansion machine to said condenser;
a non-return valve disposed in said exhaust vapor line; and
a bypass line short-circuiting said expansion machine and opening into said exhaust vapor line downstream of said non-return valve.

14. The apparatus according to claim 10, further comprising a pressure line containing a controllable valve, said vapor accumulator connected via said pressure line to said forward-flow line downstream of said at least one valve, said pressure line feeding the vapor into said vapor accumulator, and is connected to said forward-flow line upstream of said expansion machine.

15. The apparatus according to claim 10, further comprising a pressure line containing a controllable valve, said vapor accumulator is connected to a reduced-pressure region of an expansion space in said expansion machine, in parallel with said forward-flow line, by said pressure line containing said controllable valve.

16. An apparatus for carrying out a method for recovering heat and converting the heat into mechanical power in a drive system of a motor vehicle having an internal combustion engine functioning as a source of propulsion, the apparatus comprising:
an open-loop or closed-loop controller;
a working medium circuit containing at least one condenser and a forward-flow line;
at least one evaporator being heated by waste heat from the internal combustion engine and inserted into said working medium circuit;
an expansion machine coupled in terms of drive to the internal combustion engine and connected to said at least one evaporator;

a vapor accumulator;

at least one valve disposed in said forward-flow line of said working medium circuit, downstream of said at least one evaporator, said at least one valve being subjected to one of open-loop or closed-loop control by means of the open-loop or closed-loop controller and by means of which said forward-flow line is connected to said vapor accumulator or said expansion machine is shut off when a motive power of said expansion machine is not required and/or when the internal combustion engine is not being operated under power;

a controllable valve; and a blow-off line, said vapor accumulator is connected to an inlet side of said at least one evaporator by means of said controllable valve and said blow-off line.

17. An apparatus for carrying out a method for recovering heat and converting the heat into mechanical power in a drive system of a motor vehicle having an internal combustion engine functioning as a source of propulsion, the apparatus comprising:

an open-loop or closed-loop controller;

a working medium circuit containing at least one condenser and a forward-flow line;

at least one evaporator being heated by waste heat from the internal combustion engine and inserted into said working medium circuit;

an expansion machine coupled in terms of drive to the internal combustion engine and connected to said at least one evaporator;

a vapor accumulator;

at least one valve disposed in said forward-flow line of said working medium circuit, downstream of said at least one evaporator, said at least one valve being subjected to one of open-loop or closed-loop control by means of the open-loop or closed-loop controller and by means of which said forward-flow line is connected to said vapor accumulator or said expansion machine is shut off when a motive power of said expansion machine is not required and/or when the internal combustion engine is not being operated under power;

pressure relief valves;

wherein said vapor accumulator has a plurality of chambers, connected to one another in such a way, by means of said pressure relief valves, that a filling thereof takes place in succession or separately from one another and an emptying thereof takes place in succession or substantially together;

at least one condensate line; and wherein said vapor accumulator is connected to said working medium circuit downstream of said condenser by means of said at least one condensate line, and a useful volume of said vapor accumulator is configured such that a mass of the vapor corresponding to average braking operating phases is stored.

18. The apparatus according to claim 10,
wherein said working medium circuit has feed lines;
further comprising a flow control valve; and
wherein said least one evaporator is one of a plurality of evaporators connected to the exhaust line system of the internal combustion engine, said evaporators are connected to a respective one of said feed lines in said working medium circuit, said one feed line can be controlled by means of said flow control valve, said plurality of evaporators further connected to said forward-flow line and is be supplied individually, in groups or jointly with the working medium under open-loop or closed-loop control by said flow control valve.

19. The apparatus according to claim 10, further comprising:

a reservoir;

a feed pump supplying said at least one evaporator from said reservoir;

a suction pump disposed upstream of said condenser and delivering into said reservoir;

a return line leading to said reservoir; and a pressure limiting valve for said feed pump disposed on a liquid side in said working medium circuit.

20. The apparatus according to claim 12, wherein said bypass line is a multi-way valve containing a throttle valve.

21. The apparatus according to claim 14, wherein said at least one valve is a multi-way valve.

22. The apparatus according to claim 17, wherein said pressure relief valves are selected from the group consisting of filling valves and emptying valves.

23. The apparatus according to claim 19, further comprising a filter unit disposed between said suction pump and said reservoir.

24. An motor vehicle comprising:

a drive system having an internal combustion engine functioning as a source of propulsion;

an apparatus for recovering heat and converting the heat into mechanical power in said drive system, said apparatus comprising:

a working medium circuit containing at least one condenser and a forward-flow line;

at least one evaporator being heated by waste heat from said internal combustion engine and inserted into said working medium circuit;

an expansion machine coupled in terms of drive to said internal combustion engine and connected to said at least one evaporator;

a vapor accumulator;

an open-loop or closed-loop controller;

at least one valve disposed in said forward-flow line of said working medium circuit, downstream of said at least one evaporator, said at least one valve being subjected to one of open-loop or closed-loop control by means of the open-loop or closed-loop controller and by means of which said forward-flow line is connected to said vapor accumulator and/or said expansion machine is shut off when a motive power of said expansion machine is not required and/or when the internal combustion engine is not being operated under power;

said internal combustion engine having an exhaust line system coupled to said at least one evaporator; and said vapor accumulator having a casing and one of said vapor accumulator or said casing is heated by means of said exhaust line system of said internal combustion engine.

25. The motor vehicle according to claim 24, wherein the motor vehicle is selected from the group consisting of a lorry, a bus and a commercial vehicle.

* * * * *